US006683931B1

United States Patent
Stilwell, III et al.

(10) Patent No.: US 6,683,931 B1
(45) Date of Patent: Jan. 27, 2004

(54) UNIRRADIATED NUCLEAR FUEL TRANSPORT SYSTEM

(75) Inventors: William E. Stilwell, III, Lexington, SC (US); Norman A. Kent, Columbia, SC (US); John F. Staples, Blythewood, SC (US); Peter J. Vescovi, Wilmington, NC (US); Brian E. Hempy, Columbia, SC (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 10/025,728

(22) Filed: Dec. 19, 2001

(51) Int. Cl.[7] ............................................... G21C 19/00
(52) U.S. Cl. .................... 376/272; 376/302; 376/303; 376/304; 250/506.1; 250/507.1; 250/518.1
(58) Field of Search ................ 376/272, 302, 376/303, 304; 250/506.1, 507.1, 518.1

(56) References Cited

U.S. PATENT DOCUMENTS

| | | | | |
|---|---|---|---|---|
| 3,755,078 A | * | 8/1973 | Stelle ........................ | 376/302 |
| 3,837,308 A | * | 9/1974 | Harvey et al. ............... | 114/264 |
| 3,930,943 A | * | 1/1976 | Michel et al. ............... | 376/287 |
| 4,088,535 A | * | 5/1978 | Thompson et al. ......... | 114/337 |
| 4,175,669 A | * | 11/1979 | Housholder et al. ........ | 220/324 |
| 4,532,104 A | * | 7/1985 | Wearden et al. ............ | 250/506.1 |
| 4,535,250 A | | 8/1985 | Fields | |
| 4,577,112 A | * | 3/1986 | Conche et al. ............. | 250/506.1 |
| 4,780,268 A | | 10/1988 | Papai et al. | |
| 4,827,139 A | * | 5/1989 | Wells et al. ............... | 250/506.1 |
| 4,908,515 A | * | 3/1990 | McLeod .................... | 250/507.1 |
| 5,361,282 A | * | 11/1994 | Adamson et al. ........... | 376/443 |
| 5,481,117 A | | 1/1996 | Gilmore et al. | |
| 5,490,186 A | | 2/1996 | Gilmore et al. | |
| 5,513,231 A | * | 4/1996 | Jones et al. ................ | 376/261 |
| 5,515,405 A | | 5/1996 | Gilmore et al. | |
| 5,872,826 A | * | 2/1999 | Fujieda et al. .............. | 376/447 |
| 6,108,392 A | * | 8/2000 | Yoshizawa et al. .......... | 376/272 |
| 6,128,360 A | * | 10/2000 | Yoshizawa et al. .......... | 376/260 |

FOREIGN PATENT DOCUMENTS

| | | | |
|---|---|---|---|
| AU | 2311960 | * | 3/1959 |
| DE | 19631 179 A1 | * | 2/1997 |
| JP | 63255693 | * | 10/1981 |

* cited by examiner

*Primary Examiner*—Michael J. Carone
*Assistant Examiner*—R Palabrica

(57) ABSTRACT

An unirradiated nuclear fuel assembly transport canister that includes a clamshell type fuel assembly inner liner that has interior dimensions that closely conform to the outer envelope of the fuel assembly to be transported and exterior dimensions that conform to a generic overpack tubular container. The liner is inserted into the overpack tubular container which is in turn supported by a shock absorbing suspension system within a birdcage frame.

11 Claims, 4 Drawing Sheets

UNIRRADIATED NUCLEAR FUEL TRANSPORT SYSTEM

BACKGROUND OF THE INVENTION

1. Field of the Invention

This invention relates to a shipping container for a nuclear fuel assembly and, in particular, to such a container for unirradiated nuclear fuel assemblies which have a plurality of fuel rods supported in a geometric array.

2. Background Information

In the shipping and storage of unirradiated nuclear reactor fuel elements and assemblies, which contain large quantities and/or enrichments of fissile material, $U^{235}$, it is necessary to assure that criticality is avoided during normal use, as well as under potential accident conditions. For example, fuel shipping containers are licensed by the Nuclear Regulatory Commission (NRC) to ship specific maximum fuel enrichments (i.e., weights and weight-percent $U^{235}$) for each fuel assembly design. In order for a new shipping container design to receive licensing approval, it must be demonstrated to the satisfaction of the NRC that the new container design will meet the requirements of the NRC rules and regulations, including those defined in 10 CFR 71. These requirements define the Maximum Credible Accident (MCA) that the shipping container and its internal support structures must endure in order to maintain the subcriticality of the fuel assembly housed therein.

U.S. Pat. No. 4,780,268, which is assigned to the assignee of the present invention, discloses a shipping container for transporting two conventional nuclear fuel assemblies having a square top nozzle, a square array of fuel rods and a square bottom nozzle. The container includes a support frame having a vertically extending section between the two fuel assemblies which sit side by side. Each fuel assembly is clamped to the support frame by clamping frames, which each have two pressure pads. This entire assembly is connected to the container by a shock mounting frame and plurality shockmountings. Sealed within the vertical section are at least two neutron absorber elements. A layer of rubber cork cushioning material separates the support frame and the vertical section from the fuel assemblies.

The top nozzle of each of the conventional fuel assemblies is held, along the longitudinal axis thereof, by jackposts with pressure pads that are tightened down to the square top nozzle at four places. The bottom nozzle of some of these conventional fuel assemblies has a chamfered end. These fuel assemblies are held, along the longitudinal axis thereof, by a bottom nozzle spacer which holds the chamfered end of the bottom nozzle.

This and an other shipping containers (e.g., RCC-4 for generally square cross-sectional geometry pressurized water reactor (PWR) fuel assemblies) used by the assignee of the present invention are described in Certificate of Compliance No. 5450, Docket No. 71-5450, US Nuclear Regulatory Commission, Division of Fuel Cycle and Material Safety, Office of Nuclear Material Safety and Safeguards, Washington, D.C. 20555.

U.S. Pat. No. 5,490,186, assigned to the assignee of this invention, describes a completely different nuclear fuel shipping container designed for hexagonal fuel and more particularly for fuel designed for Soviet style VVER reactors. Still, other shipping container configurations are required for boiling water reactor fuel.

There is a need therefore, for an improved shipping container for a nuclear fuel assembly that can be employed interchangeably with a number of nuclear reactor fuel assembly designs.

There is a need for such a fuel assembly shipping container that can accommodate a single assembly in a lightweight, durable and licensable design.

There is a further need for such a shipping container that can be readily loaded in both a horizontal or vertical orientation.

SUMMARY OF THE INVENTION

These and other objects are achieved by the individual fuel assembly containment system design of this invention to safely transport unirradiated nuclear fuel assemblies under normal and hypothetical accident conditions. The shipping container includes an elongated inner tubular liner having an axial dimension at least as long as the fuel assembly. The liner is preferably split in half along its axial dimension so that it can be separated like a clamshell for placement of the two halves of the liner around the fuel assembly. The external circumference of the liner is designed to be closely received within the interior of an overpack formed from an elongated tubular container having an axial dimension at least as long as the liner. Preferably, the wall of the tubular container is constructed from relatively thin shells of stainless steel coaxially positioned with close cell polyurethane disposed in between. Preferably, the inner shell includes boron-impregnated stainless steel.

The inner tubular liner enclosing the fuel assembly is sideably mounted within the tubular container overpack and the overpack is sealed at each end with end caps. The tubular container overpack preferably includes circumferential ribs that extend around the circumference of the tubular container at spaced axial locations, that enhance the circumferential rigidity of the overpack and form an attachment point for peripheral shock absorbing members.

An elongated external frame, preferably of the birdcage design, is sized to receive the tubular container within the external frame in spaced relationship with the frame. The frame is formed from axially spaced circumferential straps that are connected to circumferentially spaced, axially oriented support ribs that fixedly connect the straps to form the frame design. A plurality of shock absorbers are connected between certain of the straps and preferably at least two of the circumferential ribs extending around the tubular container, to isolate the tubular container from a substantial amount of any impact energy experienced by the frame should the external frame be impacted.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
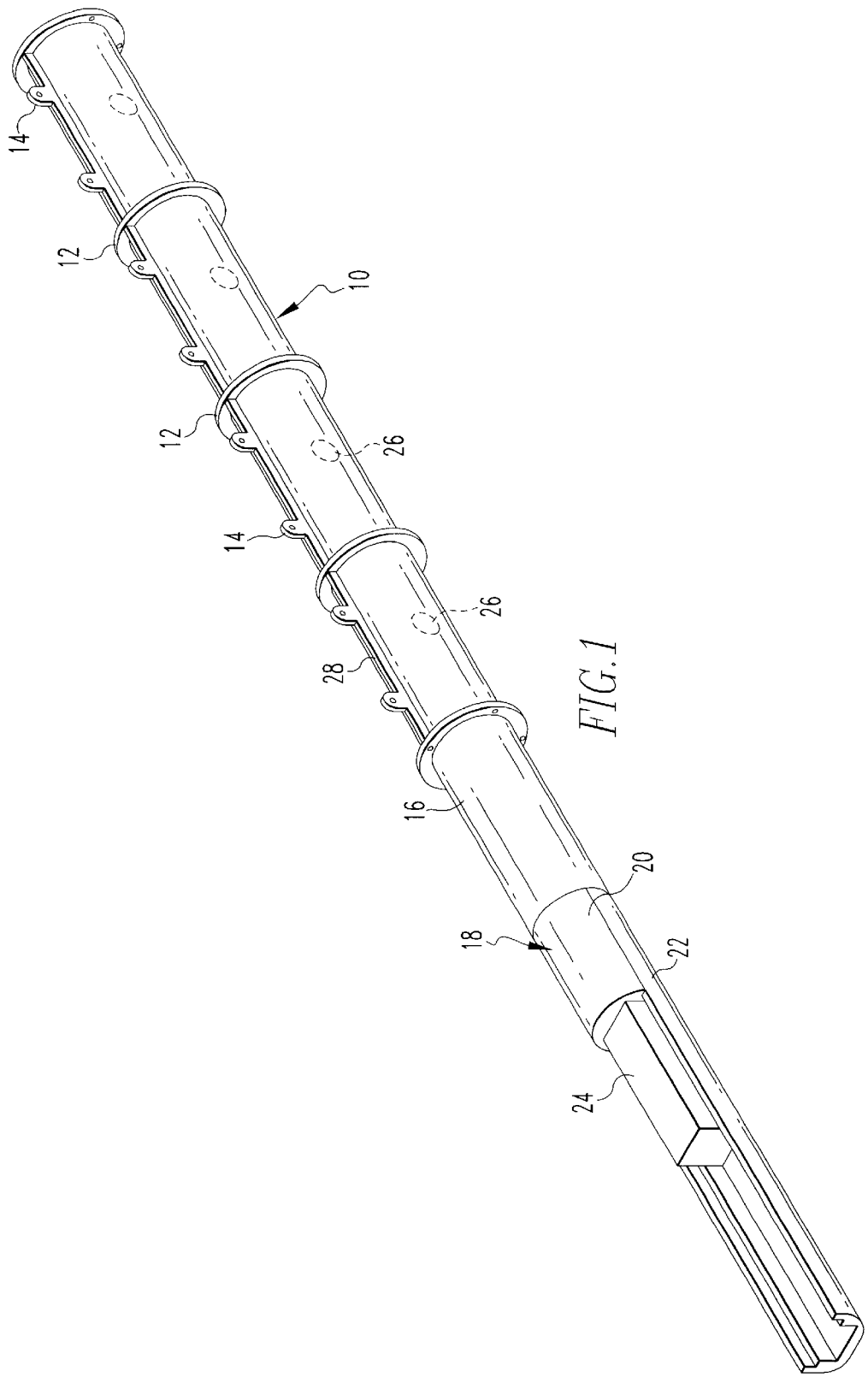
FIG. 1 Is a perspective view, partially cut away, showing the elongated inner tubular liner of this invention surrounding a fuel assembly, which is partially inserted into a boron sleeve which, in turn, is partially inserted into the overpack of this invention.

The overpack and internal components of the fuel assembly containment and transport system of this invention is illustrated in FIG. 1. A fuel assembly 24 is figuratively shown closely surrounded by the elongated inner liner 18. The inner liner 18 is shown separated into two halves 22 and 20 so the inner liner can more easily be positioned around the fuel assembly prior to loading into the overpack 10. Though the liner 18 is shown in a clamshell design, preferably split in two equal half sections 20 and 22, it should be appreciated that the liner 18 can be separated into two or more sections of equal or unequal circumferential lengths without departing from the scope of this invention. Desirably, the mating interfaces of the interior liner sections 20 and 22 include complementary keyways to facilitate the positioning of the liner sections 20 and 22 around the fuel assembly 24. The liner 18 is preferably constructed from stainless steel with an external circumferential shape and size that is designed to be closely received within the tubular overpack 10. The interior of the liner 18 is either stamped or machined to closely conform to the outer envelope of the fuel assembly 24. A boron sleeve 16 is inserted between the inner liner 18 and the overpack 10 prior to loading of the inner liner. Alternately, the exterior surface of the inner liner 18 can be coated with boron, e.g., through flame deposition or other coating techniques. As another alternate or supplement to the boron sleeve 16, boron-silicate can be poured into a void space in the inner liner 18 between the inner wall of the liner 18 that mates with the outer surface of the fuel assembly 24 and the outer surface of the liner 18 that is closely received within the overpack 10. Still another alternate is to attach plates formed () out of boron-silicate or borated stainless steel to the inside of the inner liner 18.

The overpack 10 is an elongated tubular member whose walls are preferably formed from two coaxially positioned stainless steel shells of approximately ⅛ inch thickness. Other wall thicknesses can be employed that will satisfy the strength requirements. However, greater wall thickness will add to the weight of the overpack 10. Preferably, each shell is welded or otherwise manufactured to have a continuous, seamless circumference. In this embodiment, as an example without intending to be limited, a three inch thick layer of close cell polyurethane is interposed between the shells in a closely packed arrangement and preferably the inside shell is formed from a stainless steel sheet impregnated with boron, though it should be appreciated that both shells can be formed from boron impregnated stainless steel or another moderator other than boron can be employed for this purpose. Though the overpack is shown with a circular cross-section, other geometries can be used, e.g., an oval or rectangular geometry, though a circular geometry has some structural advantages.

The overpack is fitted with a number of axially spaced circumferential ribs 12 which add circumferential rigidity to the shells that form the walls of the overpack 10. Separate shockmount attachments points 14 can be provided along an external axial rail 28 or the shockmount attachment points can be provided directly on the circumferential ribs 12. Ball bearings 26 are figuratively shown in dotted form and represent a friction reducing mechanism that is employed to assist loading of the inner liner 18 into the overpack 10. The friction reducing mechanisms can be ball bearings on either the interior surface of the overpack 10 or the exterior surface of the liner 18 or a telescoping railing arrangement that can be fixedly built into the interior wall of the overpack 10 and detachably connected to the liner 18. It should also be noted that the sections 20 and 22 of the liner 18 can be clamped together once they are positioned around the fuel assembly 24.

Figure 2:
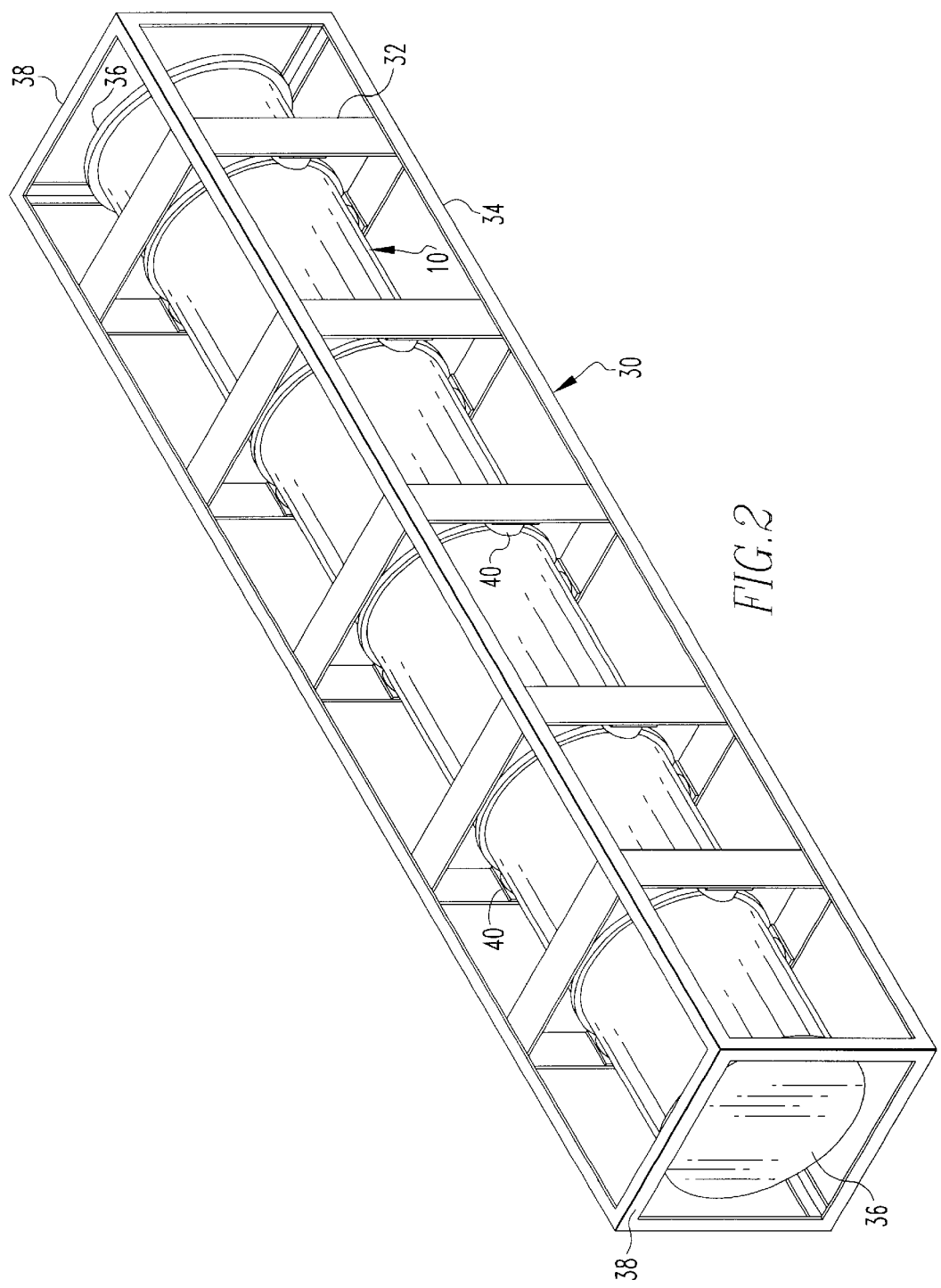
FIG. 2 is a perspective view of the overpack of this invention supported in the external frame by shock absorbing attachments.
Figure 4A:
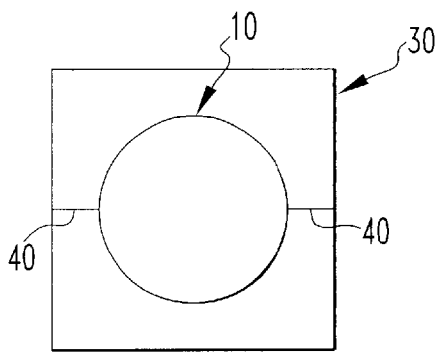
FIGS. 4A–4E are schematic representations of different embodiments for supporting the overpack within the external frame.
Figure 4B:
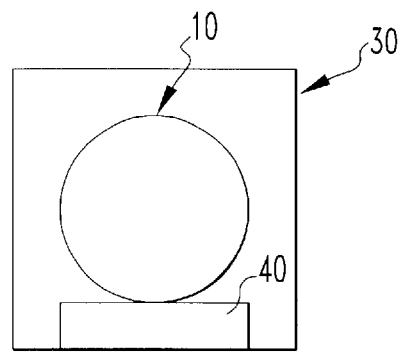
Figure 4C:
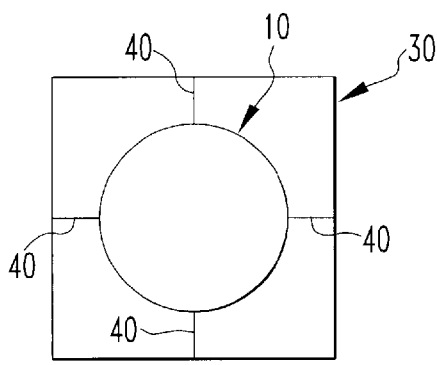
Figure 4D:
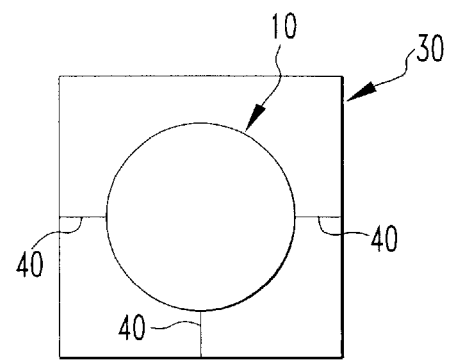
Figure 4E:
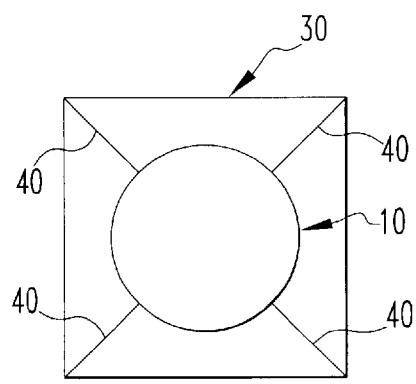

FIG. 2 illustrates the overpack 10 enclosed by two endcaps 36 which can be affixed by bolts or a quick hinge and wingnut attachment once the inner liner containing the fuel assembly is loaded. The overpack 10 is shown supported within a birdcage-like frame 30 that is formed from a plurality of axially-spaced circumferential straps 32 that are fixedly connected, such as by welding, to circumferentially-spaced and axially oriented rails 34. The end locations 38 are formed from angle straps. In this arrangement, the external frame is shown with a square cross-section though it should be appreciated that other geometries, such as a circular cross-section can be employed. The overpack 10 is supported within the frame 30 by at least one shock absorber mechanisms 40. The shock absorber support can be, for example, part number J-5735-64, supplied by Lord Corporation, Mechanical Products Division, 2000 West Grandview Boulevard, Erie, Pa. 16514. FIGS. 4A–4E illustrate different support arrangements within the birdcage frame 30 that can be used to support the overpack 10. In FIG. 4A, the overpack 10 is suspended from the midpoint of the sidewalls of the birdcage frame 30 on diametrically opposite sides of the overpack 10. In FIG. 4B, a single slightly different shockmount support secures the overpack 10 to one sidewall of the birdcage frame 30. In FIG. 4C, four shockmount supports respectively suspend the overpack 10 from the midpoints of the sidewalls of the birdcage frame 30. In FIG. 4D, three shockmount supports 40 suspend the overpack 10 from the midpoint of three of the sidewalls of the birdcage frame 30, and in FIG. 4E, the overpack 10 is suspended from four shockmounts 40 respectively attached to the intersection points of the sidewalls of the birdcage frame 30. Thus, it can be appreciated that other support arrangements can be configured without departing from the scope of this invention.

Figure 3:
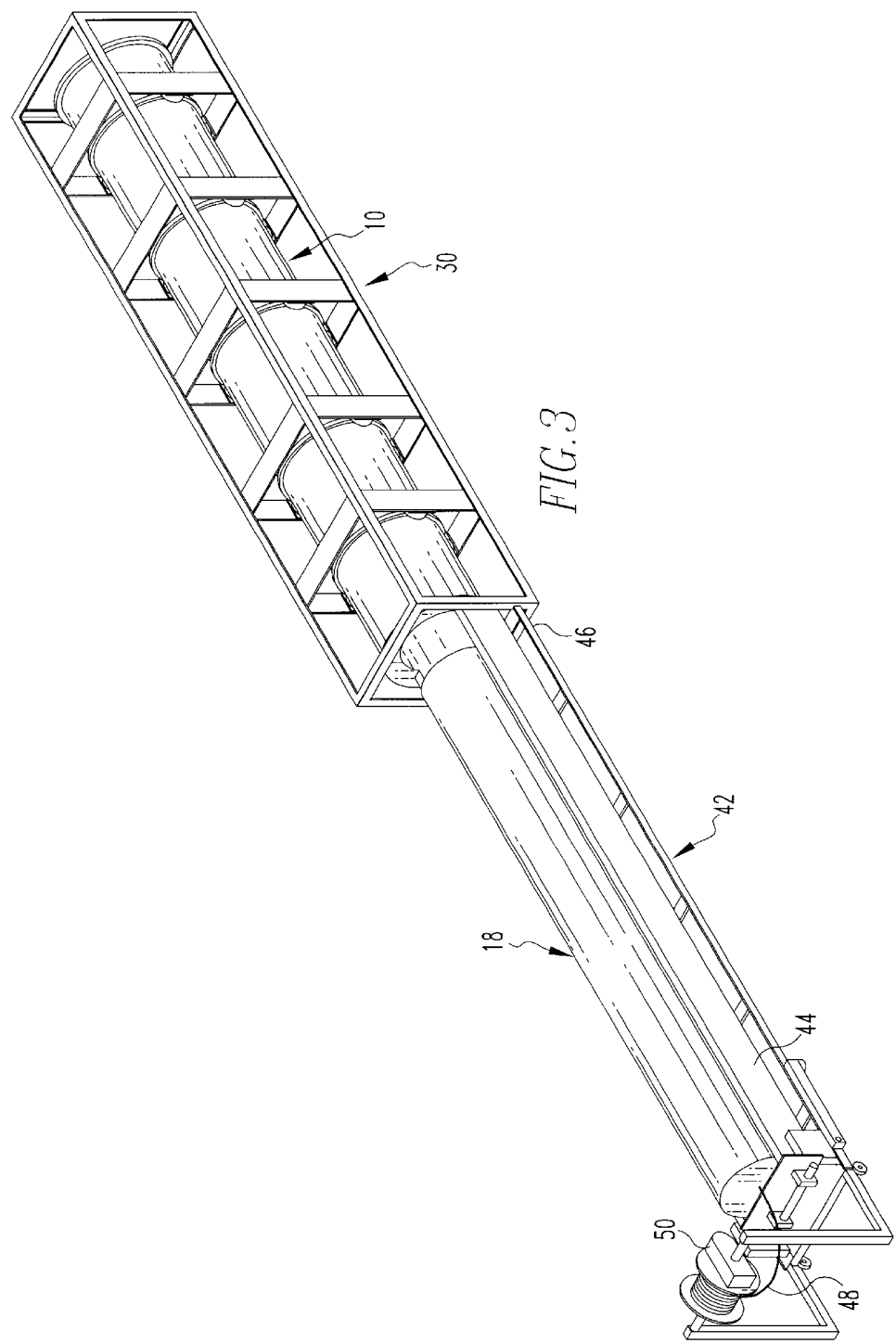
FIG. 3 is a perspective view of a carriage supporting the inner liner enclosing a fuel assembly that is aligned to load the inner liner into the overpack illustrated in FIG. 2.

FIG. 3 illustrates a car transport 42 that can be used to load the liner 18 into the overpack 10 once the liner 18 has been positioned over the fuel assembly. The sidewalls 46 of the car 42 are aligned with the outer frame 30 which aligns the cradle 44 holding the liner 18 with the axis of the overpack 10. The liner 18 can then be translated axially over rollers in the base of the loading car 42 into the overpack 10 where the frame 30 and car 42 are supported in the horizontal position. Alternatively, the frame 30 can be oriented in a vertical position and a winch 50 can control the cable 48 which is tied to the end of the car 42 to slowly lower the liner 18 into the interior of the overpack 10.

Different fuel assembly configurations can be accommodated by supplying liners with different interior geometries to be complementary with the envelope of the fuel assemblies. In its basic form, the invention is a clamshell type fuel assembly package that is inserted in an overpack tube container. An external suspension system and birdcage frame then support the tube overpack. This design allows for a very simple, low cost, lightweight replacement to current fuel transport casks.

The overpack provides the versatility to carry many different pressurized water reactor fuel designs as well as many fuel types. The overpack can carry clamshells configured for boiling water reactor fuel assemblies and other nuclear products.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A shipping container for a first nuclear fuel assembly comprising:

an elongated, tubular container having an inner and an outer coaxial, tubular shell with a close cell polyurethane core sandwiched between the inner and shells and an axial dimension at least as long as the fuel assembly and an internal cross-section larger than the first nuclear fuel assembly;

an elongated, inner, tubular liner having an axial dimension at least as long as the fuel assembly and an external circumference that is designed to be received and slidably positioned within the interior of the tubular container, the liner having an internal cross-section that substantially matches an external cross-section of the first nuclear fuel assembly;

an elongated, external frame having an axial dimension at least as long as the tubular container, sized to receive the tubular container within the external frame in spaced relationship from the frame; and shock absorbing means for attaching the tubular container to the frame so the tubular container is suspended substantially within the frame in a manner so shock absorbing means isolates the tubular container from a substantial amount of any impact energy experienced by the frame should the external frame be impacted.

2. The shipping container of claim 1 including means for reducing friction resistance as the inner, tubular liner is slid axially into or out of the tubular container, the means for reducing friction resistance being supported on both or on one or the other of the inner, tubular liner and the tubular container.

3. The shipping container of claim 2 wherein the means for reducing friction resistance comprises axially spaced ball bearings.

4. The shipping container of claim 1 wherein the tubular container includes at least one wing nut fastener end cap release.

5. The shipping container of claim 1 wherein either said inner or outer shell includes boron.

6. The shipping container of claim 5 wherein either said inner or outer shell is constructed boron stainless steel.

7. The shipping container of claim 1 wherein the external frame comprises a plurality spaced, circumferential straps that are respectively connected to circumferentially spaced axially extending members that are positioned substantially parallel to the axis of the tubular in a birdcage configuration.

8. The shipping container of claim 7 wherein the shock absorbing means comprises at least two shock absorbers respectively connected to one of the circumferential straps and the tubular container.

9. The shipping container of claim 8 wherein the shock absorbers are respectively connected to one of the circumferential straps and a circumferential rib on the tubular container.

10. The shipping container of claim including a boron-silicate core interposed between an inner and an outer surface of the elongated liner.

11. The shipping container of claim 1 including lining an inner surface of the elongated liner with plates comprising borated stainless steel or boron-silicate.

* * * * *